UNITED STATES PATENT OFFICE.

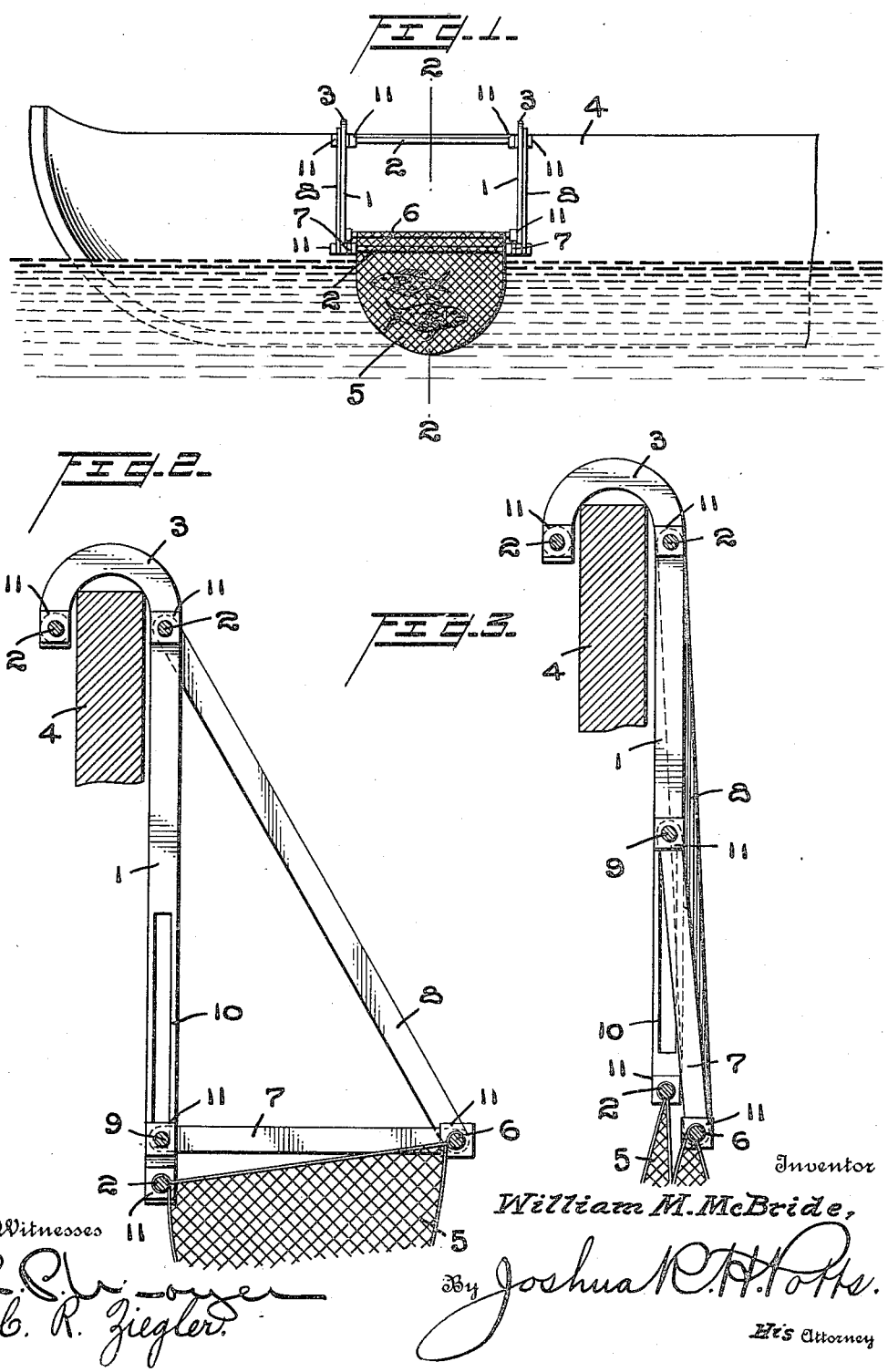

WILLIAM M. McBRIDE, OF PHILADELPHIA, PENNSYLVANIA.

FISH-BASKET.

1,151,699.   Specification of Letters Patent.   Patented Aug. 31, 1915.

Application filed February 2, 1915. Serial No. 5,755.

*To all whom it may concern:*

Be it known that I, WILLIAM M. MC-BRIDE, a citizen of the United States, residing at Philadelphia, in the county of Philadelphia and State of Pennsylvania, have invented certain new and useful Improvements in Fish-Baskets, of which the following is a specification.

My invention relates to improvements in fish baskets, the object of the invention being to provide a fish basket which is designed to be hung from the side of a boat and receive and hold fish which have been caught, said basket adapted when removed from the boat to be securely closed and permit of a ready transportation of the fish from the water.

A further object is to provide a device of the character stated which can be manufactured and sold at a reasonably low price, and which will effectually perform the functions for which it is intended.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a fragmentary view in section on an enlarged scale on the line 2—2 of Fig. 1, and Fig. 3 is a view similar to Fig. 2 showing the basket in its closed position.

1, 1 represent vertical bars connected by transverse rods 2 forming a supporting frame. The bars 1 have hook shaped upper ends 3 adapted to be positioned over the side of the boat 4 so as to suspend the basket in proper position on the outside of the boat.

The basket 5 is composed of any suitable woven material such as ordinary rope netting. It may be of any shape with an open top. The inner side of the basket is secured to the lower rod 2, and the outer side of the basket is secured to a rod 6 which is supported by two pairs of links 7 and 8. The links 7, at their inner ends, are connected by a rod 9 which is movable in longitudinal slots 10 in bars 1. The upper ends of the links 8 are pivotally connected to one of the rods 2, and it will be understood that the rod 6, above referred to, acts as a pivotal connection between the links 7 and 8. All of the rods above referred to, namely, rods 2, 6, and 9, are preferably screw-threaded at their ends for the reception of nuts 11 to securely hold the rods in proper position.

By reference particularly to Fig. 2, it will be noted that when the rod 9 is in the lower ends of the slots 10, the links 7 will be positioned horizontally to project the rod 6 outwardly and hold the basket in an open position. When the rod 9 is drawn upwardly in the slots 10, it will serve to draw the rod 6 inwardly and close the basket as shown clearly in Fig. 3. When the parts are in normal position on the outside of the boat, as shown in Fig. 1, the operator can readily open and close the basket by moving the rod 9 in the slots 10, and as the several pivot points will be in substantial alinement when the rod 9 is in the upper ends of the slots 10, the basket will remain in either open or closed position as desired.

As the basket is located in convenient reach of the fisherman in the boat, he can readily manipulate the same to receive the fish and close the basket, and the parts can be so positioned as to maintain the fish in the water so as to keep them alive until the boat reaches shore.

By reason of my improved arrangement of rods and their removable nuts, the entire structure can be readily taken apart and packed in a very small space, and when ready for use can be quickly assembled as will be readily understood.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character stated, comprising supporting bars having hook shaped upper ends, a flexible basket connected at one side to the bars, and links pivotally connected to the bars and to the other side of the basket, substantially as described.

2. A device of the character described, comprising supporting bars, rods connecting the bars, links pivotally connected to the rods and extending outwardly from the bars, and a flexible basket connected at one side to a rod at the lower end of the bars, and at its other side to a rod at the pivotal point of the outwardly projecting links, substantially as described.

3. A device of the character described, comprising supporting bars having longitudinal slots therein, rods connecting the bars, links pivotally connected at their upper ends to one of said rods, a rod mounted to slide in the slots, other links connected to the last-mentioned rod, a rod pivotally connecting the outer ends of all of said links, and a basket composed of flexible material connected to said last-mentioned rod and to the rod at the lower end of the first-mentioned bars, substantially as described.

4. A device of the character described, comprising supporting bars having longitudinal slots therein, rods connecting the bars, links pivotally connected at their upper ends to one of said rods, a rod mounted to slide in the slots, other links connected to the last-mentioned rod, a rod pivotally connecting the outer ends of all of said links, a basket composed of flexible material connected to said last-mentioned rod and to the rod at the lower end of the first-mentioned bars, said first-mentioned bars having hook shaped upper ends adapted to be positioned over the side of a boat, and removable nuts holding all of said rods in place, substantially as described.

In testimony whereof I have signed my name to this specification in the presence of two subscribing witnesses.

WILLIAM M. McBRIDE.

Witnesses:
M. R. POTTS,
CHAS. E. POTTS.

Copies of this patent may be obtained for five cents each, by addressing the "Commissioner of Patents, Washington, D. C."